Feb. 6, 1968  H. J. ROSE  3,367,786
CASING FOR DRY SAUSAGES
Filed Sept. 16, 1964  2 Sheets-Sheet 2

INVENTOR.
Henry J. Rose
BY
Healy Mosely Atty

3,367,786
CASING FOR DRY SAUSAGES
Henry J. Rose, Danville, Ill., assignor to Tee-Pak, Inc., Chicago, Ill., a corporation of Illinois
Filed Sept. 16, 1964, Ser. No. 396,948
7 Claims. (Cl. 99—176)

ABSTRACT OF THE DISCLOSURE

A casing for processing dry sausages is prepared by providing a synthetic casing with a coating on its inner surface of 0.1–5.0% soluble protein, having a molecular weight above about 10,000, such as gelatin, and containing sufficient piperazine in the range from about 0.005–5.0% by weight of the casing to substantially insolubilize the protein coating after drying. The casing with the insolubilized gelatin coating on the inside will adhere to a dry sausage emulsion during processing and will shrink with the sausage and adhere to it.

---

Figure 1:
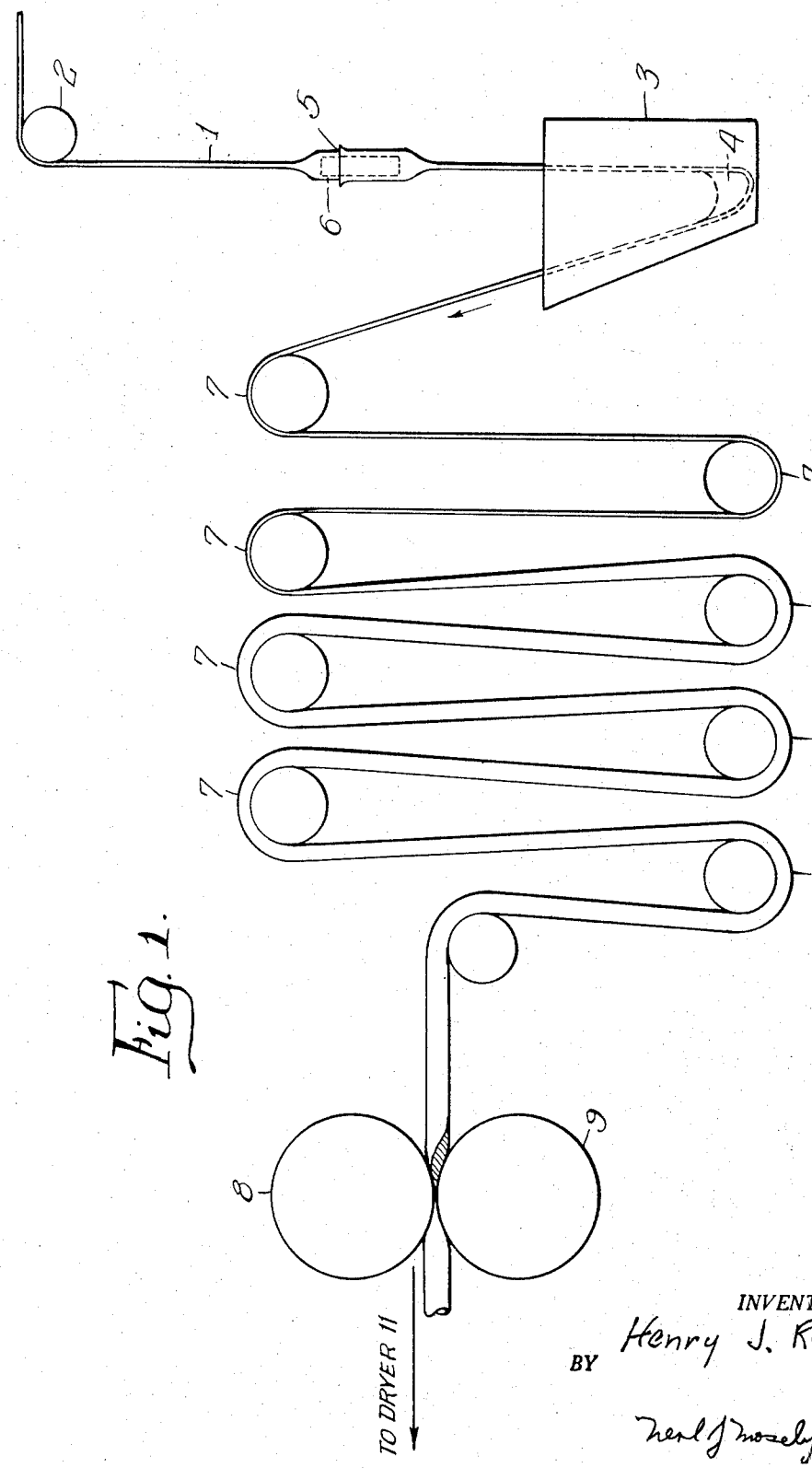

This invention relates to new and useful improvements in sausage casings, and more particularly to improvements in casings used in the manufacture of "dry sausages."

Dry sausage, of which the various salami and cervalats are prime examples, is conventionally processed by drying rather than by cooking, hence the name. Dry sausage is ordinarily served cold, without further cooking by the housewife.

The manufacture of dry sausage customarily involves mixing desired proportions of fat and lean meats, beef or pork, with selected spices, seasonings and curing materials to form an emulsion which is initially cured at a few degrees above freezing (36° to 38° F.), for two or three days depending upon the size of the meat particles so that they will be preserved sufficiently to be smoked and dried.

The chill cured meat emulsion is then firmly packed into casings of suitable size and shape, and the ends of the casing are tied ready for delivery to the drying room or smokehouse, dependent upon the type of sausage. The smoked dry sausage is smoked and then dried, while unsmoked dry sausage is dried only. The drying or curing time will vary with the particular type of sausage being processed and to some extent with the processing conditions. However, 60 to 90 days is usually considered a minimum time and periods of 120 to 180 days or more are used under some circumstances.

The processing of dry sausage is described fully in "Sausage and Ready-to-Serve Meats," published by the American Meat Institute. The term "dry sausage" is used herein includes the entire range of dry and semi-dry sausages. The semi-dry sausages include the thuringer cervalats which are dried for about 10 days (other semi-dry sausages may be dried in as short a time as 2 to 6 days). Dry sausage is usually sold in three different forms; first, new sausage or semi-dry sausage, about 10 to 25 days after smoking (having about 20% shrinkage); second, medium dry sausage, about 30 to 60 days after smoking (having about 32% shrinkage); and dry sausage, about 60 to 90 days or more after smoking (having about 40% shrinkage).

Previously, the sausage meat emulsions were stuffed into casings formed of natural materials or animal products such as sewn beef middles and hog casings. More recently, considerable interest has been developed in utilizing certain synthetic materials out of which casings could be formed. Particularly, the industry has turned to the use of casings formed of regenerated cellulose per se or of the product known in the art as fibrous casing and which is composed of cellulosic fibers impregnated and held together by regenerated cellulose.

The use of such synthetic materials is not only desirable because of the greater control over the supply that can be exercised in keeping with the rapid growth and demand of the various packaged and/or cased meat products, but also the materials can be conventionally synchronized and extruded into seamless tubular form of preselected diameter. Most importantly, casings formed of the aforesaid fibrous material, unlike the natural product can be made sufficiently flexible as well as durable to be advantageously used in the stuffing step, while also being sufficiently non-elastic that they will not stretch out of shape during or subsequent to stuffing, but will retain a more constant shape and size corresponding to that to which it was initially fabricated.

This, of course, permits a definite relation to be established between the number of slices of the sausage and weight which may be assembled as a unit, and is obviously a highly desirable characteristic in the mechanical high speed packaging methods employed today. In addition, the cellulosic casings are much more sanitary than natural casings, and are more economical to use where they do not require tying with strings to maintain their shape.

However, one of the essential drawbacks of such cellulosic materials is their lack of ability to shrink with the sausage during the drying of the sausage emulsion. In the preparation of dry sausages, the sausage tends to shrink away from the cellulosic casing and leave gaps between the meat and the casing in which there is a tendency for mold and/or so called "brown ring" to develop. This trouble is not encountered where natural casings are used since natural casings tend to expand and contact with the sausage during curing.

It is therefore one object of this invention to provide an improved cellulose casing which adheres to a dry sausage emulsion and follows the shrinkage of the sausage during curing.

A further object of this invention is to provide a method of treating a sausage to cause the same to adhere to the sausage and follow the shrinkage thereof during curing.

Still another object of this invention is to provide a method of coating casings of regenerated cellulose materials to cause the same to adhere to meat encased therein, and to follow the shrinkage of the meat during curing.

Yet another object of this invention is to provide an improved coating composition for application to regenerated cellulose casings.

A feature of this invention is the provision of a regenerated cellulose casing of tubular shape or a blank for formation of a regenerated cellulose casing of tubular shape having the inner surface thereof coated with a protein, such as gelatin, and piperazine which is effective to insolubilize the protein coating after drying, whereby the casing shrinks with and adheres to the surface of dried sausage therein.

Another feature of this invention is the provision of a process for manufacture of sausages in which a cellulosic casing is coated, prior to stuffing with the meat, with a solution of a protein, such as gelatin, and piperazine and then dried to insolubilize the protein coating, which causes the casing to adhere to and shrink with the meat during drying and to eliminate substantially the problem of "brown ring" formation in the resulting sausage.

Another feature of this invention is the provision of a casing for dry causage preparation having an internal coating of a water soluble film former which will not dissolve or disperse during filling with meat emulsion.

Still another feature of this invention is the provision of an improved coating composition comprising a solution of gelatin and piperazine.

Other objects and features of this invention will become apparent from time to time throughout the specification and claims as hereinafter related.

SUMMARY OF THE INVENTION

In recent years, regenerated cellulose casings, both fibrous and nonfibrous types, have been made and sold commercially for use in the manufacture of dry sausages. These casings have been coated on their inner surface with a thin layer of gelatin which is effective in causing the casing to adhere to a dry sausage emulsion and follow the shrinkage of the sausage during curing. Gelatin coated regenerated cellulose casings of this type, however, are subject to the disadvantage that they must be soaked in water prior to use and this soaking generally results in a very substantial loss of the gelatin coating. As a result, there has been a substantial failure of adhesion of casings to dry sausages during processing which has resulted in the production of unsatisfactory sausage products. The loss of gelatin during the soaking step can be offset to some extent by application of a heavier gelatin coating. The thickness of the gelatin coating however, is determined largely by the concentration of gelatin in the solution used to coat the casing and the coatings which have been used commercially are at a maximum practical thickness.

This invention is based upon our discovery that regenerated cellulose casings, including regenerated cellulose films, paper reinforced cellulose casings, both in flat form and in tubular form, can be treated with a mixture of a soluble protein, such as gelatin, and piperazine, in solution, to produce a coating thereon which is effective in causing the casing to adhere to coat "dry" sausage emulsion and follow the shrinkage of the sausage during curing. During the heating and drying of the casing after being coated with the solution of protein and piperazine, the protein is substantially insolubilized by reaction with the piperazine. As a result, a much smaller amount of the protein is lost during presoaking of the casing with the result that the coated casings are almost totally effective in adhering to dry causages during curing.

Where the protein used is gelatin, the incorporation of piperazine into the coating composition also provides certain additional advantages in the preparation of the casing. It has been found that the incorporation of piperazine into gelatin solutions renders such solutions more fluid and less likely to gel for extended periods of time. This enables one to coat the interior of casings, as is subsequently described, over an extended period of time without danger of gelation of the coating solution. It has also been found that the incorporation of substantial amounts of piperazine into a gelatin coating is effective to prevent "brown ring" formation which occurs occasionally in the preparation of dry sausages.

In carrying out this invention we may use any of the soluble proteins having molecular weights above 10,000 and an isoelectric point in the range from about pH 2 to pH 6. These soluble proteins include (but are not limited to) the albumins, globulins, glutelins, prolamines, prolines, hydroxyprolines, histones, elastins, and protamines. Typical examples are egg albumin, edestin, glutenin, procollagen, gelatin, gliadin, etc.

In coating tubular cellulose sausage casings, both unreinforced and fibrous types, an aqueous solution is used containing 0.1–5% soluble protein, such as gelatin and 0.005–5.0% piperazine.

It has also been found that the incorporation of a small amount, e.g. 0.05–1.0% of an insoluble non-toxic powder, in the coating solution will result in the powder being fixed in the resulting coating and functioning as an antiblocking agent for the internal surface of the casing. Powdered materials which may be used in the coating composition include wood flour, starch, walnut shell flour, chalk, talc, powdered mica, graphite, calcium phosphate, calcium carbonate, etc.

In carrying out this invention, the aqueous solution containing soluble protein and piperazine is applied to the ultimate meat contacting surface of the casing, (or sheet material from which the casing is to be formed) so that an amount in the range from about 0.1–5% of the protein and 0.005–5% of the piperazine is coated on the casing. The coating can be applied to the casing in any desired way. Thus, application to conventional regenerated cellulose casing, fibrous casing, or any other kind of casing can be made by coating the inside surfaces of the tubular casing by a technique which involves the use of a bubble of aqueous solution, emulsion, or suspension of the coating ingredients inside the tube. In this method of coating, the casing moves while the bubble of liquid remains still, with the result that the inner surface of the casing is wetted and coated and then moves on beyond the bubble to a casing dryer. During the drying step the piperazine reacts with the protein to insolubilize it without detracting from the properties of promoting adhesion to the surface of dry sausages when processed in the casing.

The coating technique is better illustrated in the following description of the bubble coating method as applied to a commercial production line of either regenerated cellulose tubing or casing or paper reinforced cellulose casing which is known in the trade as fibrous casing.

Figure 2:
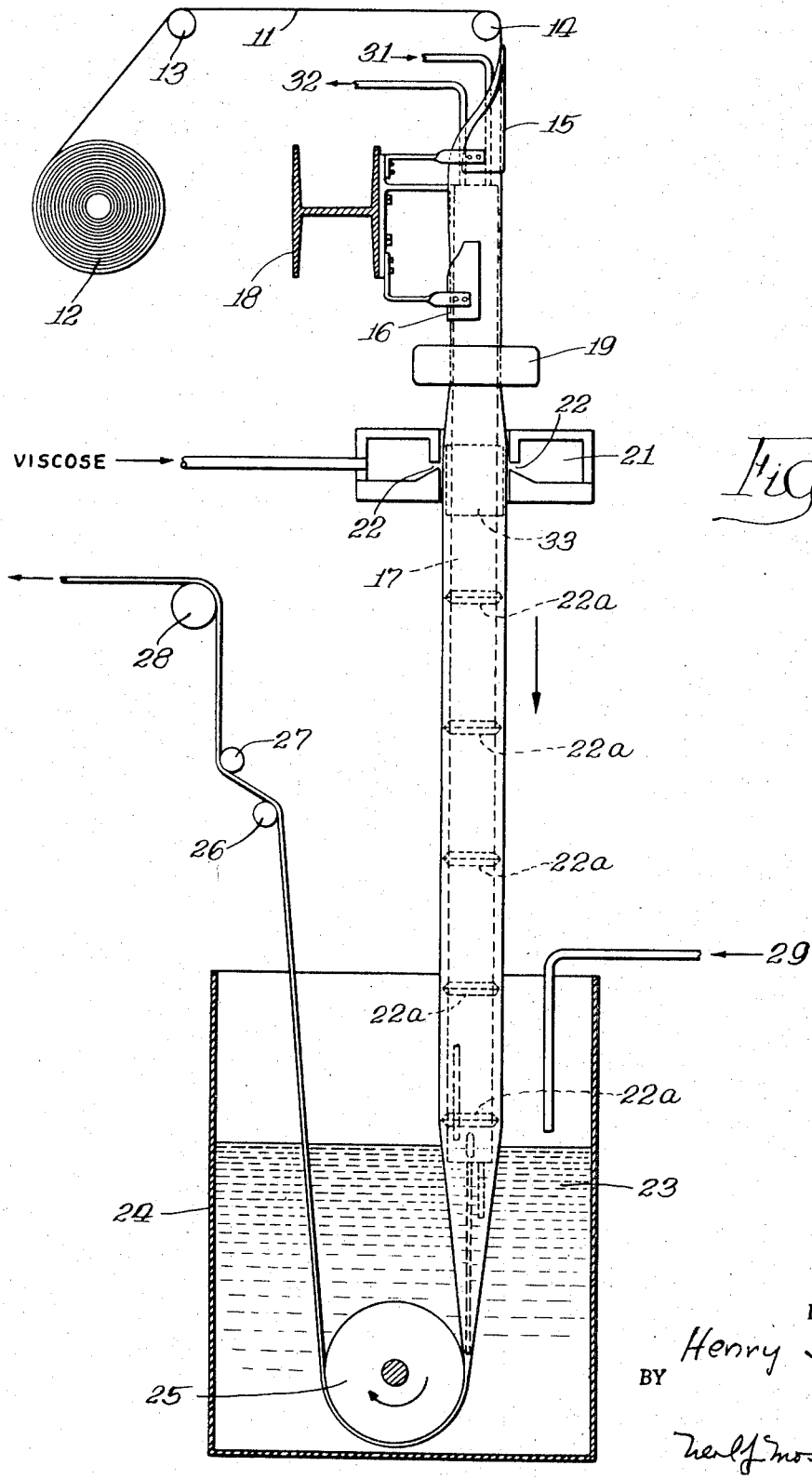

In the accompanying drawings, to be taken as a part of this specification there is clearly and fully illustrated a preferred embodiment of this invention, in which drawings, FIG. 1 is a diagrammatic view illustrating the formation of an interior coating in sausage casing prior to its introduction to a dryer, and FIG. 2 is a diagrammatic view illustrating the formation of the fibrous casing prior to the coating step carried out in FIG. 1.

BUBBLE COATING PROCEDURE

Referring to FIG. 1 of the drawings, casing which may be wet fibrous casing or wet unreinforced regenerated cellulose casing 1 in a collapsed flat form is transferred from a bath (not shown) in which the casing has been washed after being impregnated with viscose followed by regeneration, or in the case of regenerated cellulose casing, after regeneration, (both of these being well known processes for the preparation of fibrous or regenerated cellulose casing) into a slack box 3, by passage over rolls 2. Between the rolls 2 and slack box 3, an aqueous solution containing 2% gelatin, (or other soluble protein) and 0.2% piperazine is placed within the casing 1, the solution being admitted through cut 5 in the casing 1 before rubber couplers 6 are tied into casing 1.

The solution can be made by mixing gelatin with cold tap water and allowing the gelatin to swell for about one-half hour. To this mixture there is added hot tap water with agitation and heating to 50° C. for a period of 5 min. There is then added 0.2% of piperazine based on total solution weight. The batch is stirred and maintained at 45–50° C. This solution is stable against gelling for periods of up to 16 hours. If desired, up to 20% glycerol may be included in the solution to assist in plasticizing the casing and the film which is formed as a coating on the inside of the casing.

A preferred coating composition consists of tap water containing 2% gelatin and 0.2% piperazine and may optionally include up to 20% glycerol. As noted above, the coating composition may include 0.05–1.0% of walnut shell flour or starch as an anti-blocking agent. The piperazine performs several functions in the coating composition. Piperazine is effective to maintain the gelatin solution fluid and resistant to gelling for extended periods of time (e.g. up to 16 hours or more). It is also effective, after drying, to fix the gelatin coating on the casing and to render it substantially insoluble to prevent appreciable loss of gelatin during presoaking of the casing just prior to use.

The bubble 4 of the coating solution lies at the bottom of slack box 3, and as casing 1 moves as shown, the interior of casing 1 is progressively contacted with bubble 4, and is forced open to conform to the configuration of the bubble. The bubble is refilled with additional solution as it becomes depleted, preferably at intervals of one or two hours.

Casing 1 then passes over additional rollers 7 which are subjected to a drying atmosphere, air being maintained within casing 1, as shown, for size control. Casing 1 then passes through idler roll 8 and roll wheel 9 into dryer 11 (not shown) where it is further dried at a temperature of about 200° F. for a period of 5 to 15 min. In this last drying step, the coating ingredients become firmly attached to the inner surface of the casing and the gelatin is insolubilized as previously described.

This procedure is effective to apply a coating of 0.1–5% gelatin (based on weight of the casing) and smoke ingredients corresponding to 0.005–5% piperazine, inside the casing.

The drying time and temperature are interdependent factors insofar as affecting the drying of the casing and the nature of the resulting film are concerned, as will be apparent to those skilled in the art. Other combinations of time and temperature besides those illustrated above, can be used, provided of course, that the temperature is not so high and time not so long that the casing itself or the coating film is injured.

When other soluble proteins are used in the coating solution, drying times and temperatures are selected which are appropriate for the particular protein. For best results, temperatures of about 175° to 225° F. or higher should be used.

Under the above described conditions, a number of runs were made, using fibrous casing as the casing being treated, as follows:

*Example I*

Various casings are coated on the inside and dried using the above described application technique, the coating being accomplished using a solution containing 2% gelatin, 0.2% piperazine, and 0.2% starch. The coated casings are easy to open as a result of the anti-blocking action of starch particles in the coating.

The casings are presoaked in hot water according to standard commercial practice and are stuffed with salami emulsion. The stuffed casings are cured over a period of 6–8 weeks at a temperature of 50° F. and relative humidity of 70%. Over this extended period of time there is a very substantial shrinkage of the sausage as the sausage emulsion is cured, and in each case the casing adheres to and follows the shrinkage of the sausage so that there is no separation of the casing from the sausage. The casings which contain both gelatin and piperazine in the coating are found to strip from the sausage with the normal tendency to pull away meat.

It has been found that the treated casings adhere to and follow the shrinkage of the sausage during shirring while untreated casings are largely ineffective and subject to the objections previously discussed. Casings prepared in this manner are found to be unexpectedly improved in appearance. Stuffed sausages are found to have a much higher gloss which may be related to improved adhesion. It has also been found that casings which are prepared as described above, incorporating both gelatin and piperazine in the coating, lose only a very small proportion of the gelatin coating, e.g. about 10–35%, while casings which have been coated with gelatin alone can lose up to 90–95% of the coating during the presoaking period.

*Example II*

A coating solution is prepared by mixing 2% egg albumin, and 0.2% piperazine into cold tap water. If desired, up to 20% glycerol may be included in the solution to assist in plasticizing the casing and the coating, and 0.05–1.0% wood flour may be included to provide a non-blocking coating.

This coating solution is applied to regenerated cellulose casing (either fibrous or non-fibrous type) by the bubble coating procedure described above. This procedure is effective to apply a coating of albumin and piperazine inside the casing. After drying, the coating is substantially insoluble in water and adherent to dry sausage during processing.

*Example III*

A coating solution is prepared by mixing 2% glutenin and 0.2% piperazine into cold tap water. If desired, up to 20% glycerol may be included in the solution to assist in plasticizing the casing and the coating.

This coating solution is applied to regenerated cellulose casing (either fibrous or non-fibrous type) by the bubble coating procedure described above. This procedure is effective to apply a coating of glutenin and piperazine inside the casing. After drying, the coating is substantially insoluble in water and adherent to dry sausage during processing.

COATING OF FIBROUS CASING DURING FORMING

Another application technique by means of which a coating of protein and liquid smoke can be applied to the inside of the casing, is by applying such coating to the inside of fibrous casing as the latter is being produced in accordance with well known procedures.

Fibrous casing is made by passing a ribbon of paper around a mandrel to form a tube, applying viscose to the outside surfaces of the paper tube and in between the overlapped portion thereof which is to become a seam, and then passing the tube down through a coagulating bath containing acid wherein regeneration of the viscose takes place, then washing and drying the tube according to the procedures described, for example, in U.S. Patent Nos. 1,937,225, and 2,045,349.

Referring to FIG. 2 of the drawings, a ribbon of paper 11 of the type described in U.S. Patent 2,045,349, and which is preferably a long fiber hemp paper weighing about 12½ lbs./ream, passes from roll 12 over rollers 13 and 14 and around formers 15 and 16 which form the paper into tubular form, then proceeds downwardly over mandrel 17. Mandrel 17, which may be a steel pipe having an outside diameter of 2 to 7 in., more or less, depending on the size of the tube or casting which is to be produced, may be of any suitable length, conveniently about 30′ long, and, as shown, can be suspended from a suitable support such as an I beam 18 or the like. The paper 11, now shaped in the form of a tube, passes downardly over the mandrel 17, through a forming ring 19 which is a metallic ring having an inside diameter slightly larger than the diameter of the tube-shaped paper passing through it, and whose purpose it is to maintain the paper in tubular form until it reaches the coating die 21. Coating die 21 is essentially a hollow ring structure made of metal or the like and contains an annular opening 22 circumferentially of its inside diameter through which viscose, which is contained under positive chamber of the die 21, is applied to the outer surfaces of the downwardly extending paper tube to coat it uniformly with viscose.

A sleeve 33 formed of metal or the like which is shrunk onto the mandrel 17 functions to effect more uniform application of viscose through the orifice 22 as paper 11 passes downwardly thereover.

A number of slip rings 22a which may be shrunk onto mandrel 17 every three feet or thereabouts, and which are made of metal or the like, serve to keep the inside wall of the viscose impregnated paper tube from scraping against the outside wall of mandrel 17, as the tube moves downwardly.

Continuing in its downward movement, the viscose-impregnated paper tube enters a coagulating bath 23 of 5% sulfuric acid (which may contain additional salts, e.g. $Na_2SO_4$ or $(NH_4)_2SO_4$) contained in a suitable vessel 24. On being contacted with the acid, conversion of the viscose to regenerated cellulose begins and continues as the tube moves around roller 25, over and under wiper rods 26 and 27, roller 28, and then through washing bath and drying tunnels not shown here, but being similar to those used in the art of making regenerated cellulose casings as exemplified in U.S. Patent 1,937,225 and related patents.

Acid for bath 23 is supplied through pipe 29. The same kind and concentration of acid is supplied through in the inside of mandrel 17 through pipe 31. Spent acid is removed through pipe 32 at a rate which is balanced by the incoming acid as shown. The speed of the casing in its downward movement is approximately 20' per min. and the contact time in the bath is of the order of 50 sec.

In applying the coating of gelatin (or other soluble protein and piperazine to the inside of casing such as that described above, the coating mixture may be incorporated with the inlet acid which enters at pipe 31. The gelatin and piperazine are bled into the acid stream just prior to the point of coagulation or extrusion of the viscose. A preferred composition consists of 0.1–5.0% gelatin and 0.005–5% piperazine in the acid solution.

Besides the foregoing techniques for applying coating of gelatin and piperazine to the inside surfaces of casing, such coatings can also be applied to the surface or surfaces or cellulosic sheets per se before they are formed into tubes. For example, sheets of cellulose impregnated fibrous sheeting can be treated in accordance with the present invention by applying to the surface thereof, a coating of gelatin and piperazine from solution, suspension, or emulsion, in an amount sufficient to uniformly coat the surface with 0.1–5% gelatin and 0.005–5% piperazine.

After drying, the gelatin is substantially insolubilized. After this treatment, the sheeting can be formed into a tube by any conventional technique. Additional coating may be applied to the sheet after it has been impregnated with cellulose and the coating may be applied to the sheet material in a bath through which the sheet passes prior to being dried. The coating can also be applied to the sheet after it has been washed and dried.

It is seen from the above description that the technique of this invention results in the production of highly and unexpectedly superior fibrous and regenerated cellulose casings with respect to the performance characteristics of such casings when used in the preperation of dry sausages. The procedure is simple and lends itself to easy adaptation within the well known commercial fabrication of fibrous casings and regenerated cellulose casings and involves the use of extremely small amounts of materials which are easy to apply and effective for the purposes of the invention.

The coatings which are applied within the casing do not adversely affect the desirable permeability characteristics of the casing with respect to moisture vapor, smoke, dyeing and the like.

As described above, the coating of gelatin and piperazine is effective to cause the casing to adhere to dry sausage during curing and to cause the casing to shrink with the sausage during the curing process.

While this invention has been described with special emphasis upon the treatment of ordinary regenerated cellulose and fibrous casing, it will be seen that it is also applicable to coating the inside surfaces of casings whose outside surfaces are coated with saran or other polymer compositions, such as the casings described in U.S. Patents 2,812,259; 2,627,471; 2,627,483; and the like, as well as casings made from other suitable casing films, e.g. alginates, amylose, polyvinyl alcohol, etc., both of the unreinforced and fibrous types.

While I have described my invention fully and completely with special emphasis upon certain preferred embodiments, I wish it to be understood that within the scope of the appended claims the invention may be practiced otherwise than as specifically described herein.

What is claimed is:

1. A synthetic tubular sausage casing for processing dry sausages, said casings having the inner surface thereof coated with 0.1–5.0% soluble protein, having a molecular weight above about 10,000 and an isoelectric point in the range from pH 2 to pH 6, and sufficient piperazine in the range from about 0.005–5.0% by weight of the casing, to substantially insolubilize the protein coating after drying, whereby the casing shrinks with and adheres to the surface of dry sausage therein.

2. A synthetic tubular sausage casing as defined in claim 1 in which the casing material is regenerated cellulose.

3. A sausage casing as defined in claim 2 in which said soluble protein is gelatin.

4. A sausage casing as defined in claim 3 in which the casing is of a fiber-reinforced regenerated cellulose.

5. In the manufacture of dry sausage wherein sausage meat emulsion is stuffed into synthetic casings and stored for an extended time in an atmosphere of controlled temperature and humidity to dry the encased meat emulsion uniformly, the improvement which comprises coating the interior of the casing prior to stuffing with meat, with 0.1–5.0% soluble protein, having a molecular weight above about 10,000 and an isoelectric point in the range from pH 2 to pH 6, and 0.005–5.0% piperazine, sufficient to substantially insolubilize the protein coating after drying, whereby the casing adheres to and shrinks with the meat during drying, and the finished sausage is substantially free from brown ring formation.

6. A process as defined in claim 5 in which the casing material is regenerated cellulose.

7. A process as defined in claim 6 in which said soluble protein is gelatin.

References Cited

UNITED STATES PATENTS

| | | | |
|---|---|---|---|
| 2,576,921 | 12/1951 | Buscher | 106—130 X |
| 2,802,745 | 8/1957 | Bosel | 99—176 |
| 3,150,984 | 9/1964 | Broadhead | 99—176 |
| 3,158,488 | 11/1964 | Firth | 99—176 X |

OTHER REFERENCES

"The Merck Index," 7th edition 1960, published by Merck and Co. Inc., Rahway, N.J., p. 821, article entitled Piperazine.

HYMAN LORD, *Primary Examiner.*